(12) United States Patent
Marchante Moreno

(10) Patent No.: US 7,540,731 B2
(45) Date of Patent: Jun. 2, 2009

(54) LONGITUDINAL FILM DRAWING DEVICE

(75) Inventor: Innocente Marchante Moreno, Le Bourget du Lac (FR)

(73) Assignee: Darlet Marchante Technologies S.A., Le Bourget du Lac (FR)

( * ) Notice: Subject to any disclaimer, the term of this patent is extended or adjusted under 35 U.S.C. 154(b) by 197 days.

(21) Appl. No.: 10/551,666

(22) PCT Filed: Mar. 30, 2004

(86) PCT No.: PCT/FR2004/000795

§ 371 (c)(1),
(2), (4) Date: Dec. 7, 2005

(87) PCT Pub. No.: WO2004/089604

PCT Pub. Date: Oct. 21, 2004

(65) Prior Publication Data

US 2006/0182830 A1    Aug. 17, 2006

(30) Foreign Application Priority Data

Mar. 31, 2003    (FR) .................................. 03 03940

(51) Int. Cl.
*B29C 55/06*    (2006.01)
(52) U.S. Cl. ...................... 425/66; 264/288.4
(58) Field of Classification Search ................... 425/66; 264/288.4
See application file for complete search history.

(56) References Cited

U.S. PATENT DOCUMENTS

| 3,351,697 | A | * | 11/1967 | Hufnagel et al. | ......... 264/288.4 |
| 3,619,460 | A | * | 11/1971 | Chill | ....................... 264/288.4 |
| 4,310,485 | A | * | 1/1982 | Dauber | ..................... 264/288.4 |
| 4,408,974 | A | * | 10/1983 | Comerio | ..................... 425/194 |
| 4,683,093 | A | * | 7/1987 | Hagiwara et al. | ........... 264/479 |
| 6,372,172 | B1 | * | 4/2002 | Sudduth et al. | .......... 264/289.3 |

FOREIGN PATENT DOCUMENTS

| AT | 305 609 | | 3/1973 |
| FR | 1450585 | | 6/1966 |
| GB | 1105029 | * | 3/1968 |
| GB | 1174313 | | 12/1969 |

* cited by examiner

*Primary Examiner*—Robert B Davis
*Assistant Examiner*—Joseph Leyson
(74) *Attorney, Agent, or Firm*—Oliff & Berridge, PLC

(57) ABSTRACT

The device (2) comprises four drawing cylinders (6, 7, 8, 9) on which the film (5) passes and which are associated with press cylinders (13, 21, 26), comprising: a first drawing cylinder (6) having a fixed axis (10), a second drawing cylinder (7) having a fixed axis (12) which is offset in relation to the previous one, a third drawing cylinder (8) whose position is adjustable and a fourth drawing cylinder (9) having a fixed axis (25). Said cylinders (6 A 9) are rotationally driven at differentiated speeds, such that a first drawing stage is formed between the second cylinder (7) and the third cylinder (8), whereby the drawing distance (D) is preferably adjustable, and a second drawing stage is formed between the third cylinder (8) and the fourth cylinder (9). The invention is used for the longitudinal drawing of synthetic films.

11 Claims, 2 Drawing Sheets

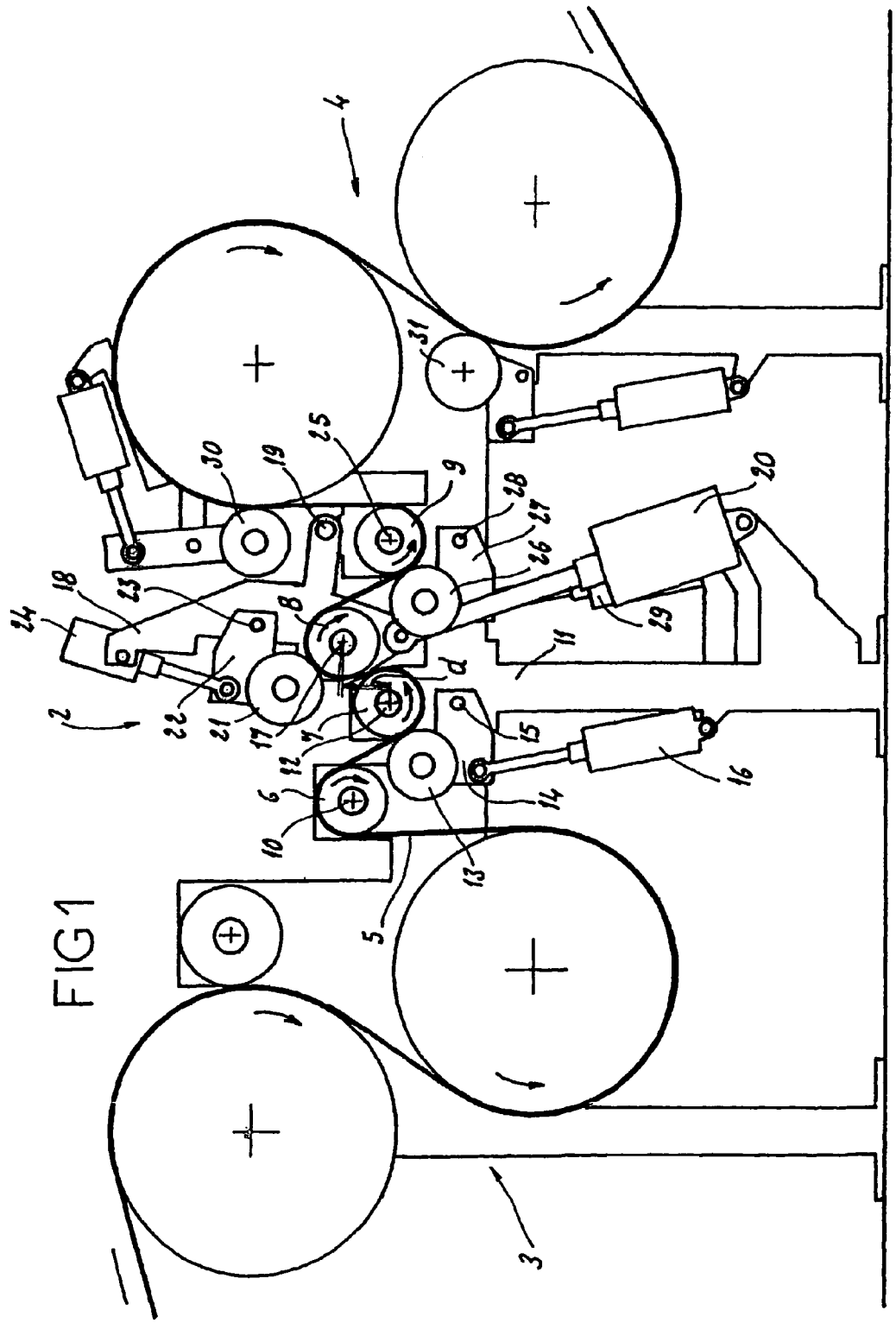

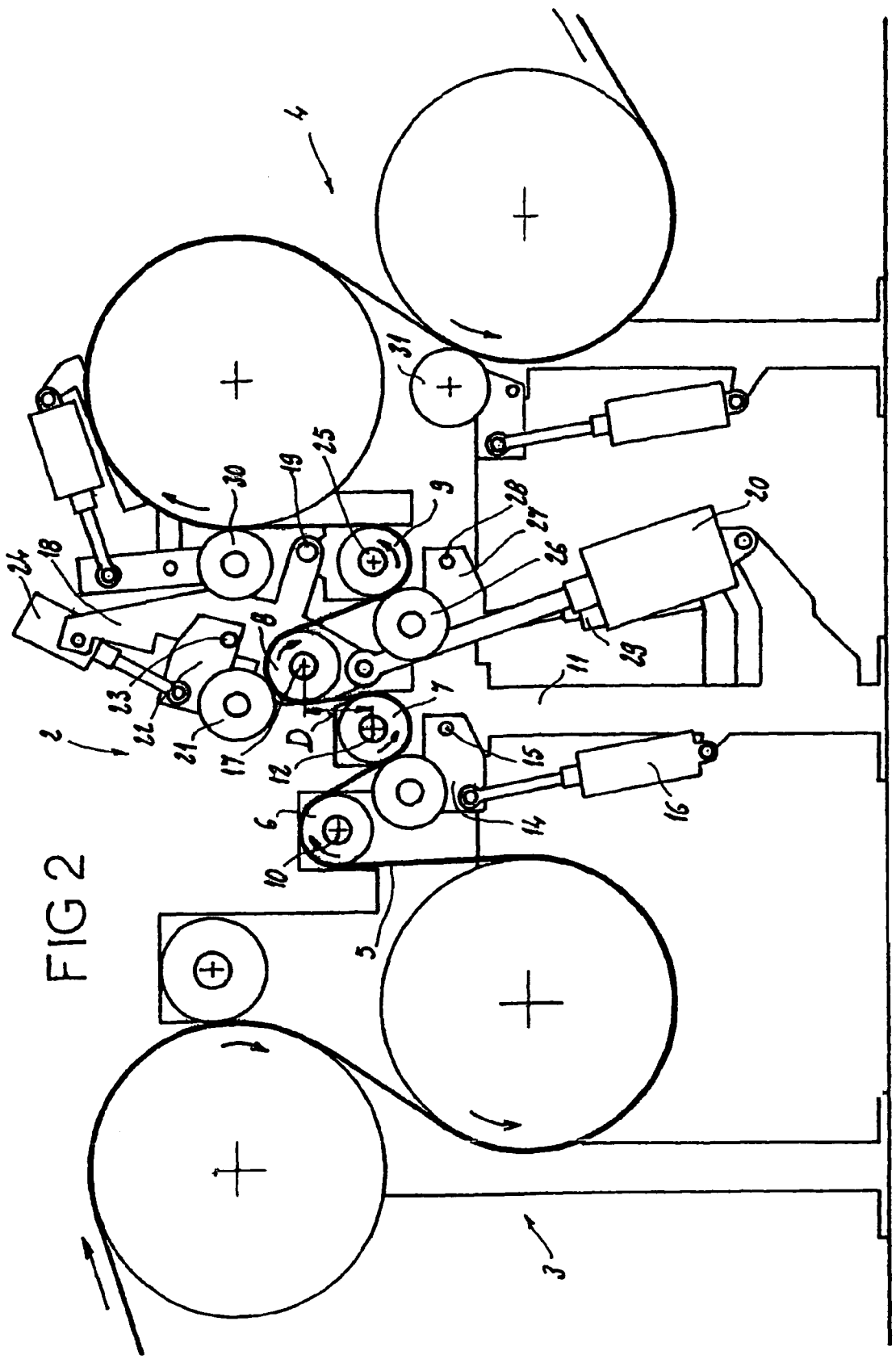

LONGITUDINAL FILM DRAWING DEVICE

BACKGROUND

The present invention relates to a longitudinal drawing device for synthetic films.

Longitudinal film drawing devices used in industry usually comprise, from upstream end downstream (referring to the direction of travel of the film that is to be drawn):

a set of preheating rolls, the number and diameter of which are chosen according to the material of which the film that is to be drawn is made, according to the thickness of this film and according to the desired production rate;

a drawing unit exhibiting a succession of cylinders, the first cylinders being driven at relatively low speed and the next cylinders being driven at a faster speed, so as to draw the film between successive cylinders driven at different increasing speeds;

a thermostabilization unit, the function of which is to allow the thermal expansion and stabilization of the film before the subsequent transverse drawing of this film.

SUMMARY

In longitudinal drawing devices of the aforementioned type, the preheating rolls and the drawing cylinders, and the rolls of the thermostabilization unit are kept at temperature, in the traditional way, by a circulation of hot fluid from a boiler, this hot oil being introduced into a double jacket of said rolls or cylinders by devices of the rotary seal type.

More effectively, and in a way that is better suited to the subject of the present invention, these cylinders may also be temperature regulated by virtue of the presence, within the double jacket of each cylinder, of a device of the "heat pipe" type, that is to say of a sealed vacuumtight chamber partially full of fluid chosen so that its thermodynamic characteristics exhibit a vapor phase and a liquid phase in the range of operating temperatures of the machine.

A supply of feet to the interior of the cylinder is here performed by a resistive electric heating element, by radiation or by the circulation of hot air, the heat energy needed then being transmitted to the film through the enclosure of the "heat pipe" type by the more or less complete vaporization of the liquid it contains; the vapor produced condenses on the cold parts of the cylinder, to keep the latter at a uniform temperature and to rapidly transfer heat between the heating means and the film.

Such devices have the advantage of saving energy, of having a better heat exchange coefficient, and of having better temperature regulation, but also have the advantage of making it possible to avoid devices such as rotary seals which, aside the maintenance problems inherent in them, especially in the case of high-speed machines, have the disadvantage, by their very construction, of applying a significant slowing torque to the cylinder. This slowing torque effect is aggravated by the fact that, in order to allow the oil to circulate in the journals of the cylinder, these journals have to be big enough, which consequently entails the presence of large-size rolling bearings which in themselves apply a significant resistive torque.

As regards the main part of the machine, which is the drawing unit, the devices most commonly used are those termed double drawing stage devices, such as those described, for example, in German Patent DE 19622085 (BRUCKNER) or in the corresponding European Patent EP 0 907 495, or alternatively in British Patent GB 1 174 313. The double drawing stage is rendered necessary by the natural tendency that synthetic films subjected to longitudinal drawing have to shrink at the same time in the transverse direction.

This tendency to transverse shrinkage has imperatively to be avoided because the transverse shrinkage of the film, whilst being drawn out longitudinally, not only disturbs the uniformity of the orientation of the molecular chains (the isotropy of the material) but also has the disadvantage of leading to additional thickness at the edges of the film, which disrupts the film thickness profile and considerably increases the amount of waste because these edges, which would later be used as gripping regions by the grippers used for the transverse drawing, need to be cut off and discarded after the transverse drawing stage.

In order to reduce this phenomenon of transverse shrinkage, the longitudinal drawing of the film is preferably done between two cylinders at differential speed, the tangential distance between which is as short as possible; the adhesion of the film to the cylinders, the temperature of which is kept to an appropriate value, under these conditions prevents the film from yielding to its natural tendency to transverse shrinkage. This well known arrangement allows a film to be drawn longitudinally between two cylinders at differential speed and can effectively be used for low production rates.

By contrast, when the production rate and therefore the drawing increases, which it does with modern machines, the fact of maintaining the tangential distance between two cylinders has the consequence of increasing, over this short distance, the acceleration to which the film is subjected (which acceleration soon exceeds the acceleration that the drawn material can tolerate) and therefore leads to breakage of the film. To avoid this breakage it is possible to increase the tangential distance between the two cylinders, but this immediately results in an undesired transverse shrinkage effect.

In order to alleviate this disadvantage, double drawing stage devices such as already mentioned hereinabove have been proposed, the total drawing being split into two successive drawing stages each having the shortest possible tangential distance between the drawing cylinders, thus avoiding the transverse shrinkage.

In other words, the overall draw ratio which in a single drawing stage would lead to excessive acceleration, is split between two stages, thereby reducing the acceleration, without in any way offering the film the possibility to shrink transversely.

This is why the so-called double drawing stage devices are commonly used in industry. They generally have six cylinders in line.

The need to use six cylinders stems from the fact that in order to maintain a short tangential drawing distance it is necessary to reduce the diameter of the drawing cylinders which, in consequence, reduces the area for contact between the film and the surface of each cylinder. When this area becomes insufficient for the friction between the film and the cylinder to be high enough to prevent the film from slipping on the drawing cylinders as a result of the drawing force, it becomes necessary to provide a second cylinder synchronous with the previous one, the purpose of this second cylinder being to hold the film without slip, before or after the drawing.

An additional problem encountered when increasing the production rate stems from the fact that the air trapped by the film constitutes, between this film and the surface of the cylinder, an air cushion which detaches the film from the surface of the cylinder, thereby annulling its resistance to the drawing forces. The film then begins to "float" both in the longitudinal direction and in the transverse direction, which means that drawing irregularities arise in the longitudinal direction.

To avoid the formation of this air cushion it is necessary to provide press cylinders which, unfortunately in the current in-line configuration of the drawing cylinders, cannot be positioned at the point of entry of the air.

Another disadvantage of the double drawing stage devices, with six cylinders in line, lies in the fact that each drawing cylinder and also each accompanying press cylinder, is liable to damage the surface of the film, something which is increasingly disadvantageous when considering that the packaging films currently demanded have increasingly sensitive surfaces, with low sealing threshold or the presence of so-called barrier material, whereas at the same time the requirement of perfecting the surface of the film is becoming stricter.

Finally, it is perfectly obvious that multiplying the number of cylinders, whether these be drawing cylinders or press cylinders, increases the overall cost of these cylinders and of their drive devices.

Quite obviously, these disadvantages are further exacerbated, in the case of other known drawing systems which have multiple drawing stages involving a great many cylinders (see, for example, French Patent 1 450 585 and Austrian Patents 305609).

The present invention aims to avoid all the aforementioned disadvantages and its purpose is therefore to provide a device allowing high speed longitudinal drawing of synthetic films, with two drawing stages, but reducing as far as possible the number of drawing cylinders and avoiding, through a suitable geometric layout of the press cylinders, the creation of an air cushion.

To this end, the longitudinal film drawing device that is the subject of the invention, which is of the double drawing stage device kind, with drawing cylinders and press elements, particularly press cylinders, associated with the drawing cylinders, comprises four drawing cylinders over which the film that is to be drawn passes in succession, with a first drawing cylinder, particularly of fixed axle, a second drawing cylinder the axle of which is offset forward and vertically with respect to the axle of the first drawing cylinder, a third drawing cylinder the axle of which is offset forward and vertically with respect to the axle of the second drawing cylinder, and a fourth drawing cylinder the axle of which is offset forward and vertically with respect to the axle of the third drawing cylinder, the device also comprising motorized means for the rotational drive of all or some of the drawing cylinders, at differentiated speeds, so as to form a first drawing stage between the second cylinder and the third cylinder and so as to form a second drawing stage between the third cylinder and the fourth cylinder, the drawing of the film thus occurring on each side of the third cylinder.

Thus, the invention provides a longitudinal film drawing device which is characterized by a set of four drawing cylinders only (rather than six cylinders as there were in the known devices), with an arrangement of these four cylinders that allows double drawing of the film, and allows optimum positioning of all the press cylinders or other press elements, as specified hereinafter.

In a preferred embodiment of the longitudinal drawing device that is the subject of the invention, the first drawing cylinder and the second drawing cylinder have fixed respective axles, whereas the third drawing cylinder has a position-adjustable axle so as to regulate the drawing distance in the first drawing stage. To this end, the third drawing cylinder is advantageously mounted on a mobile coupling, in particular articulated to the frame of the drive, motorized means such as at least one ram being provided for moving the mobile coupling with a view to regulating the drawing distance in the first drawing stage.

Inasmuch as press elements, such as press cylinders, are associated at least with the second drawing cylinder, with the third drawing cylinder and with the fourth drawing cylinder, provision is advantageously here made for the press element associated with the third drawing cylinder to be supported by the mobile coupling mentioned above so as to accompany this third drawing cylinder in its regulating movements.

As for the fourth drawing cylinder, this may have a fixed axle, particularly when situated at the same height as the axle of the second drawing cylinder.

In a variant, the fourth drawing cylinder, like the third, has a position-adjustable axle, for example mounted on another mobile coupling, so as also to regulate the drawing distance in the second drawing stage formed by the third cylinder and the fourth cylinder.

The motorized rotational-drive means are designed to drive the first drawing cylinder and the second drawing in synchronism or almost in synchronism, that is to say with a slightly higher speed for the second cylinder, so as to allow better adhesion of the film.

These motorized rotational-drive means may positively drive the four drawing cylinders of the device, the third drawing cylinder being driven at a speed higher than that of the second drawing cylinder and defining the draw ratio in the first drawing stage, and the fourth drawing cylinder being driven at a speed higher than that of the third drawing cylinder and defining the draw ratio in the second drawing stage.

In one variant, the motorized rotational-drive means are designed to positively turn only the first drawing cylinder, the second drawing cylinder and the fourth drawing cylinder while the third drawing cylinder turns driven by the film at a speed someway between that of the second cylinder and that of the fourth cylinder.

The press elements may all consist of press cylinders, applied against the associated drawing cylinders at the points of tangency of the film or near these points of tangency.

However, in a variant that applies particularly to the case of a third drawing cylinder not positively driven by the motorized rotational-drive means, provision is made for the press element associated with this third drawing cylinder to consist of an electrostatic close application system, preferably of the belt type.

In its entirety, the longitudinal film drawing device that is the subject of the present invention has the following advantages:

The device allows double drawing of the films, contenting itself with four drawing cylinders in total (instead of six in current devices), and this leads to a simpler, more compact and more economical embodiment, both in terms of the arrangement of the cylinders themselves and in terms of the means for rotating them.

The special arrangement of the drawing cylinders allows optimum positioning of the press cylinders; in particular, the positioning of the press cylinder associated with the second drawing cylinder avoids the formation of an undesirable air cushion. If the third drawing cylinder is mounted on mobile gear, the mounting of the associated press cylinder on the same mobile gear allows this press cylinder to "accompany" the movement of the third press cylinder, so that said press cylinder remains positioned at the ideal point regardless of the drawing distance chosen for the first drawing stage.

Another advantage of the device of the invention, aside from the mere fact that it involves a very small number of cylinders, results from the fact that the drawing is done on either side of one and the same intermediate cylinder, namely the third cylinder. Thus, surprisingly, the two phases of drawing are performed with a higher film tension, which means that the stability of the transverse position of the film is much greater, the film not having a tendency to "float" by a few centimeters, from right to left and left to right alternately, as it did in the conventional drawing devices. The elimination of this "float" is essential in the case of machines in which the film needs, having been longitudinally drawn, to be drawn transversely by a device involving grippers gripping the film via its longitudinal edges.

The device that is the subject of the invention offers a possibility of simply regulating the drawing distance in the first drawing stage, and possibly also in the second drawing stage.

An additional advantage of this device results from the fact that the regulating of the drawing distance is done not by linear movement but by rotating the mobile gear about an axis of pivoting with the mobile gear being rotating by rams, particularly pneumatic rams, this making it possible to introduce an important safety element in the event of the film breaking during the high-speed drawing.

What happens is that if such a breakage occurs, the film which is already at high temperature has a tendency to stick to the cylinders and become wound upon them in successive layers, something which in traditional linear-displacement machines may very quickly lead to breakage of the drawing cylinders. By contrast, in the device that is the subject of the invention, the pneumatic rams can be specified to gradually relax their tension, if this tension becomes excessive as a result of the accidental winding of the film around a drawing cylinder, thus protecting the machine from any risk of damage.

BRIEF DESCRIPTION OF THE DRAWINGS

The invention will be better understood with the aid of the description which follows, with reference to the attached schematic drawing depicting, by way of example, one embodiment of this longitudinal film drawing device:

FIG. 1 depicts a longitudinal drawing device according to the present invention, in the view from the side, in a first position;

FIG. 2 is a side view similar to FIG. 1 but illustrating a second position of the longitudinal drawing device.

DETAILED DESCRIPTION OF EMBODIMENTS

In the drawing, the longitudinal drawing device is denoted in its entirety by the reference 2. This longitudinal drawing device 2 is placed between a set of preheating rolls 3, which set is situated upstream, and a thermostabilization unit 4 situated downstream, the concepts of upstream and downstream being used by reference to the direction of travel (indicated by arrows) of the film 5 that is to be drawn.

The longitudinal drawing device 2 itself comprises, from upstream end downstream, four drawing cylinders 6, 7, 8 and 9 with which press cylinders are associated as detailed herein.

The first drawing cylinder 6 is a cylinder of fixed axle 10, mounted directly on the frame 11 of the device 2. This first cylinder 6 is optionally equipped with a press cylinder (not depicted) applied to the point of tangency between the film 5 and the cylinder 6.

The second drawing cylinder 7 is also a cylinder of fixed axle 12, mounted directly on the frame 11 of the device 2. The axle 12 of this second cylinder 7 is offset forward and also downward with respect to the axle 10 of the first cylinder 6.

A press cylinder 13 is associated with the second drawing cylinder 7, being positioned in such a way that its point of contact corresponds strictly to the point of tangency between the film 5 and the second drawing cylinder 7, so as to prevent an air cushion from forming at that point. The press cylinder 13 is mounted on a support 14 is self-mounted to pivot, about an axle 15, on the frame 11. At least one ram 16, mounted between the frame 11 and the support 14, controls the pivoting of this support 14, so as to move the press cylinder 13 closer to or further away from the second drawing cylinder 7.

The first two drawing cylinders 6 and 7 are rotationally driven in synchronism or almost in synchronism by motorized means, not depicted, of the individual motor or geared motor unit type with transmission shaft. It will be noted that a slight difference in speed between the two cylinders 6 and 7 allows the film 5 to adhere better to these cylinders.

The third drawing cylinder 8 has its axle 17 situated forward and above the axle 12 of the second drawing cylinder 8. This third cylinder 8 is mounted on a mobile coupling 18 articulated about an axle 19 on the frame 11. At least one ram 20, mounted between the frame 11 and the mobile coupling 18 causes this mobile coupling 18 to pivot about its articulation axle 19, so as to regulate the distance between the axle 12 of the second drawing cylinder 7 and the axle 17 of the third drawing cylinder 8 and therefore so as to regulate the drawing distance between the two cylinders 7 and 8 which together form a first drawing stage.

A press cylinder 21 is associated with the third drawing cylinder 8. The press cylinder 21 is mounted on a support 22, itself mounted to pivot, about an axle 23, on the mobile coupling 18. At least one ram 24, mounted between the mobile coupling 18 and the support 22, causes the pivoting of this support 22, so as to move the press cylinder 21 closer to or further away from the third drawing cylinder 8.

Thus, the press cylinder 21 is kept above the third drawing cylinder 8, exactly on or very close to the point of tangency of the film 5 coming from the second drawing cylinder 7, irrespective of the regulated position of the mobile coupling 18, or in other words irrespective of the drawing distance between the two cylinders 7 and 8.

The third drawing cylinder 8 is rotationally driven, by motorized means not depicted, at a speed higher than that of the second drawing cylinder 7 and chosen so as to obtain the desired longitudinal draw ratio for the first drawing stage.

In the example illustrated in the drawing, the fourth drawing cylinder 9 is a cylinder of fixed axle 25, mounted directly on the frame 11 of the device 2. The axle 25 of this fourth drawing cylinder 9 is offset, forward and also downward, with respect to the axle 17 of the third cylinder 8; the axle 25 of the fourth cylinder 9 here lies at the same height as the axle 12 of the second cylinder 7.

A press cylinder 26 is associated with the fourth drawing cylinder 9, being positioned in such a way that its point of contact also corresponds exactly to the point of tangency between the film 5 and the fourth drawing cylinder 9. The press cylinder 26 is mounted on a support 27 itself mounted to pivot, about an axle 28, on the frame 11. At least one ram 29, mounted between the frame 11 and the support 27, controls the pivoting of this support 27, so as to move the press cylinder 26 closer to or further away from the fourth drawing cylinder 9.

This fourth (and last) drawing cylinder 9 is rotationally driven by motorized means, not depicted, at a speed higher than that of the third drawing cylinder 8 and chosen so as to obtain the desired longitudinal draw ratio for the second drawing stage, here formed by the last two cylinders 8 and 9.

Thus, overall, the longitudinal drawing device 2 depicted in the drawing comprises a first drawing stage formed of the two cylinders 7 and 8, and a second drawing stage formed of the two cylinders 8 and 9.

To use this longitudinal drawing device 2, the film to be drawn 5, originating from the set of preheating rolls 3, passes over the first drawing cylinder 6, under the second drawing cylinder 7, over the third drawing cylinder 8 and under the fourth drawing cylinder 9 before reaching the thermostabilization unit 4 (where other press cylinders 30 and 31 not involved in the present invention come into action). Actuation of the rams 16, 24 and 29 allows the press cylinders 13, 21 and 26 to be moved away from the corresponding drawing cylinders 7, 8 and 9 so as to allow the film 5 to be fed into the device 2 at the beginning.

FIG. 1 shows the longitudinal drawing device 2 in an operating position in which the mobile coupling 18 occupies its lowered position, the ram 20 having its rod retracted, thus placing the third drawing cylinder 8 in its lowered position, for which the drawing distance (in the first drawing stage) is minimal, the minimal value of this distance being indicated as d.

In contrast, FIG. 2 shows the longitudinal drawing device 2 in an operating position in which the mobile coupling 18 occupies its raised position, the ram 20 having its rod deployed, thus placing the third drawing cylinder 8 in its raised position, for which the drawing distance (in the first drawing stage) is maximal, the maximum value of this distance being indicated as D.

The following would not constitute departures from the scope of the invention as defined in the attached drawings:

If recourse was had to any means equivalent to those described hereinabove, this regarding in particular the means for moving and positioning of the mobile coupling 18 bearing the third drawing cylinder 8, which may consist of a pneumatic or hydraulic ram or of an electrical screw jack, or of a positioning motor, etc., the important feature here being that of regulating the distance between the second drawing cylinder 7 and the third drawing cylinder 8 and therefore the drawing distance in the first drawing stage.

If the mounting of the fourth drawing cylinder 9 and of the associated press cylinder 26 was not fixed but also on a mobile coupling so as, here also, to be able to regulate the drawing distance in the second drawing stage.

If, instead of the motorized rotational drive of all four drawing cylinders 6, 7, 8 and 9, only the first cylinder 6, the second cylinder 7 and the fourth cylinder 9 were motorized, in which case the third drawing cylinder 8 would turn driven by the film 5 passing over it, its speed automatically adapting to suit the speed of the film 5 subjected to the drawing, and this third cylinder 8 through its presence preventing the transverse shrinkage of the film 5. In this variant, the use of cylinders of the "heat pipe" type, to provide a resistive torque, would be particularly beneficial.

Particularly in the latter variant, if the press cylinder 21 associated with the third drawing cylinder 8 were replaced by an electrostatic close application system, preferably of the belt type, allowing the film 5 to be blocked in the widthwise direction on the non-driven drawing cylinder 8 without exerting an additional slowing torque on the cylinder 8.

The invention claimed is:

1. A longitudinal drawing device for drawing a synthetic film, the longitudinal drawing device comprising:
    a frame; and
    drawing cylinders over which the film is drawn from an upstream position to a downstream position, the drawing cylinders including:
    a first drawing cylinder that rotates about a first axle;
    a second drawing cylinder that rotates about a second axle, the second axle being offset in a forward direction and in a vertical direction with respect to the first axle;
    a third drawing cylinder that rotates about a position-adjustable third axle, the third axle being offset in the forward direction and in the vertical direction with respect to the second axle; and
    a fourth drawing cylinder that rotates about a fourth axle, the fourth axle being offset in the forward direction and in the vertical direction with respect to the third axle;
    the longitudinal drawing device further comprising:
    a first press element, a second press element, and a third press element corresponding to the second drawing cylinder, the third drawing cylinder, and the fourth drawing cylinder, respectively;
    a motorized rotational drive means for rotationally driving at least two of the cylinders at differentiated speeds so as to form a first drawing stage between the second drawing cylinder and the third drawing cylinder and a second drawing stage between the third drawing cylinder and the fourth drawing cylinder such that the film is drawn on an upstream and a downstream side of the third cylinder;
    a mobile coupling on which the third drawing cylinder is mounted and that supports the second press element, and
    a motorized means for causing the mobile coupling to pivot about an axis connected to the frame of the drawing device so as to adjust a position of the third axle and thereby regulate a drawing distance in the first drawing stage formed between the second drawing cylinder and the third drawing cylinder,
    wherein the second press element accompanies the third drawing cylinder as the position of the third axle is adjusted and the drawing distance in the first drawing stage is regulated.

2. The longitudinal drawing device as claimed in claim 1, wherein the first axle and the second axle are fixed axles.

3. The longitudinal drawing device as claimed in claim 1, wherein the fourth axle is a fixed axle.

4. The longitudinal drawing device as claimed in claim 1, wherein the fourth axle is a position-adjustable axle and is mounted on a second mobile coupling so as to regulate a drawing distance in the second drawing stage formed between the third drawing cylinder and the fourth drawing cylinder.

5. The longitudinal drawing device as claimed in claim 1, wherein the motorized rotational drive means drives the first drawing cylinder and the second drawing cylinder in synchronism or almost in synchronism.

6. The longitudinal drawing device as claimed in claim 5, wherein the motorized rotational drive means positively drives the drawing cylinders, the third drawing cylinder being driven at a faster speed than the second drawing cylinder so as to define a first draw ratio in the first drawing stage and the fourth drawing cylinder being driven at a faster speed than the third drawing cylinder so as to define a second draw ratio in the second drawing stage.

7. The longitudinal drawing device as claimed in claim 5, wherein the motorized rotational drive means positively turns only the first drawing cylinder, the second drawing cylinder, and the fourth drawing cylinder and the film causes the third drawing cylinder to turn at an intermediate speed between a speed of the second drawing cylinder and a speed of the fourth drawing cylinder.

8. The longitudinal drawing device as claimed in claim 1, wherein each press element is a press cylinder that presses against the corresponding drawing cylinder at substantially a point of tangency of the film and the drawing cylinder.

9. The longitudinal drawing device as claimed in claim 1, wherein the third press cylinder comprises an electrostatic close application system.

10. The longitudinal drawing device as claimed in claim 3, wherein the second axle and the fourth axle are positioned at substantially the same height in the vertical direction.

11. The longitudinal drawing device as claimed in claim 5, wherein the motorized rotational drive means drives the second drawing cylinder at a slightly higher speed than the first drawing cylinder.

* * * * *